United States Patent
Yamasaki et al.

[11] Patent Number: 6,056,876
[45] Date of Patent: *May 2, 2000

[54] METHOD AND APPARATUS FOR WASTEWATER TREATMENT

[75] Inventors: Kazuyuki Yamasaki, Hiroshima; Atsushi Yokotani, Fukuyama; Satoshi Nishio, Fukuyama; Takamasa Uchiyama, Fukuyama, all of Japan

[73] Assignee: Sharp Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/858,759

[22] Filed: May 19, 1997

[30] Foreign Application Priority Data

May 28, 1996 [JP] Japan ................................ 8-133329

[51] Int. Cl.⁷ ............................... C02F 3/06; C02F 9/00
[52] U.S. Cl. .......................... 210/617; 210/622; 210/631; 210/694; 210/151; 210/195.1; 210/196; 210/199; 210/202; 210/259; 210/284
[58] Field of Search ..................... 210/617, 622, 210/631, 669, 694, 143, 195.1, 196, 205, 259, 266, 284, 150, 151, 202, 221.2, 199

[56] References Cited

U.S. PATENT DOCUMENTS

| | | |
|---|---|---|
| 853,217 | 5/1907 | Bordigoni .............................. 210/150 |
| 2,388,795 | 11/1945 | Montgomery et al. .................. 210/151 |
| 4,895,645 | 1/1990 | Zorich ..................................... 210/150 |
| 5,049,266 | 9/1991 | Gotz et al. .............................. 210/151 |
| 5,578,214 | 11/1996 | Yamasaki et al. ....................... 210/617 |
| 5,599,443 | 2/1997 | Yamasaki et al. ....................... 210/151 |

FOREIGN PATENT DOCUMENTS

| | | |
|---|---|---|
| 64-43306 | 2/1989 | Japan . |
| 1095000A | 4/1989 | Japan . |
| 2229595A | 9/1990 | Japan . |
| 4260497A | 9/1992 | Japan . |

*Primary Examiner*—Ivars Cintins
*Attorney, Agent, or Firm*—Nixon & Vanderhye P.C.

[57] ABSTRACT

A method and apparatus for wastewater treatment is provided which can treat persistent surface active agents and coloring substances in wastewater, and which is compact and economical. The wastewater treatment method introduces water to be treated into a charcoal tank 3 packed with charcoal 10 and treats the water therein, the water to be treated having been pretreated in a pretreatment section 2. The water under treatment is introduced from the charcoal tank 3 into an activated carbon tower 6 packed with activated carbon 17 to treat the water therein. Treatment of the water in two stages, namely, treatment by bioactivated charcoal 10 and treatment by bioactivated carbon 17, makes it unnecessary to carry out backwashing of the activated carbon tower 6 and regeneration of activated carbon 17. The service life of the activated carbon can be greatly extended.

14 Claims, 5 Drawing Sheets

| OPERATING CONDITIONS | TREATED WATER QUANTITY | RETURN WATER QUANTITY | RETENTION TIME | | | | VALVE OPENING | | |
|---|---|---|---|---|---|---|---|---|---|
| | | | CHARCOAL TANK | OXYGEN DISSOLUTION TANK | ACTIVATED CARBON TOWER | | SOLENOID CONTROLLED VALVE 23 | SOLENOID CONTROLLED VALVE 24 | SOLENOID CONTROLLED VALVE 22 |
| NORMAL | 1 | 1 | 1.5 | 0.1 | 0.5 | | 50% | 50% | 50% |
| QUALITY OF WATER TO BE TREATED UNFAVORABLE | 1 | 0 | 3 | 0.2 | 1 | | 0% | 100% | 50% |
| QUALITY OF TREATED WATER UNFAVORABLE | 0 | 1 | 3 | 0.2 | 1 | | 100% | 0% | 0% |
| QUALITY OF TREATED WATER FAIRLY GOOD | 2 | 0 | 1.5 | 0.1 | 0.5 | | 0% | 100% | 100% |

NOTE 1: WATER TO BE TREATED ... WATER FROM PRETREATMENT SECTION 2 TO CHARCOAL TANK 3

NOTE 2: TREATED WATER ... WATER FROM ACTIVATED CARBON TOWER 6 TO TREATED WATER TANK 7

NOTE 3: RETURN WATER ... WATER FROM ACTIVATED CARBON TOWER 6 TO CHARCOAL TANK 3

METHOD AND APPARATUS FOR WASTEWATER TREATMENT

BACKGROUND OF THE INVENTION

The present invention relates to a method and apparatus for advanced wastewater treatment utilizing both bioactivated charcoal and bioactivated carbon.

Hitherto, at wastewater treatment apparatuses of various industrial facilities and research laboratories, it has been general practice to utilize activated carbon for wastewater treatment at a final stage of such treatment, that is, at the stage of advanced treatment. One known way of utilization of activated carbon at the finishing stage or advanced treatment stage of a process for wastewater treatment is simply to take advantage of adsorptive function or physical treatment effect of activated carbon as in a conventional arrangement illustrated in FIG. 5.

On the other hand, there is also known a physico-biological way of utilization such that microorganisms are grown on activated carbon so that physical adsorption function of activated carbon itself and biological treatment by microorganisms grown on the activated carbon can be both utilized.

Figure 5:
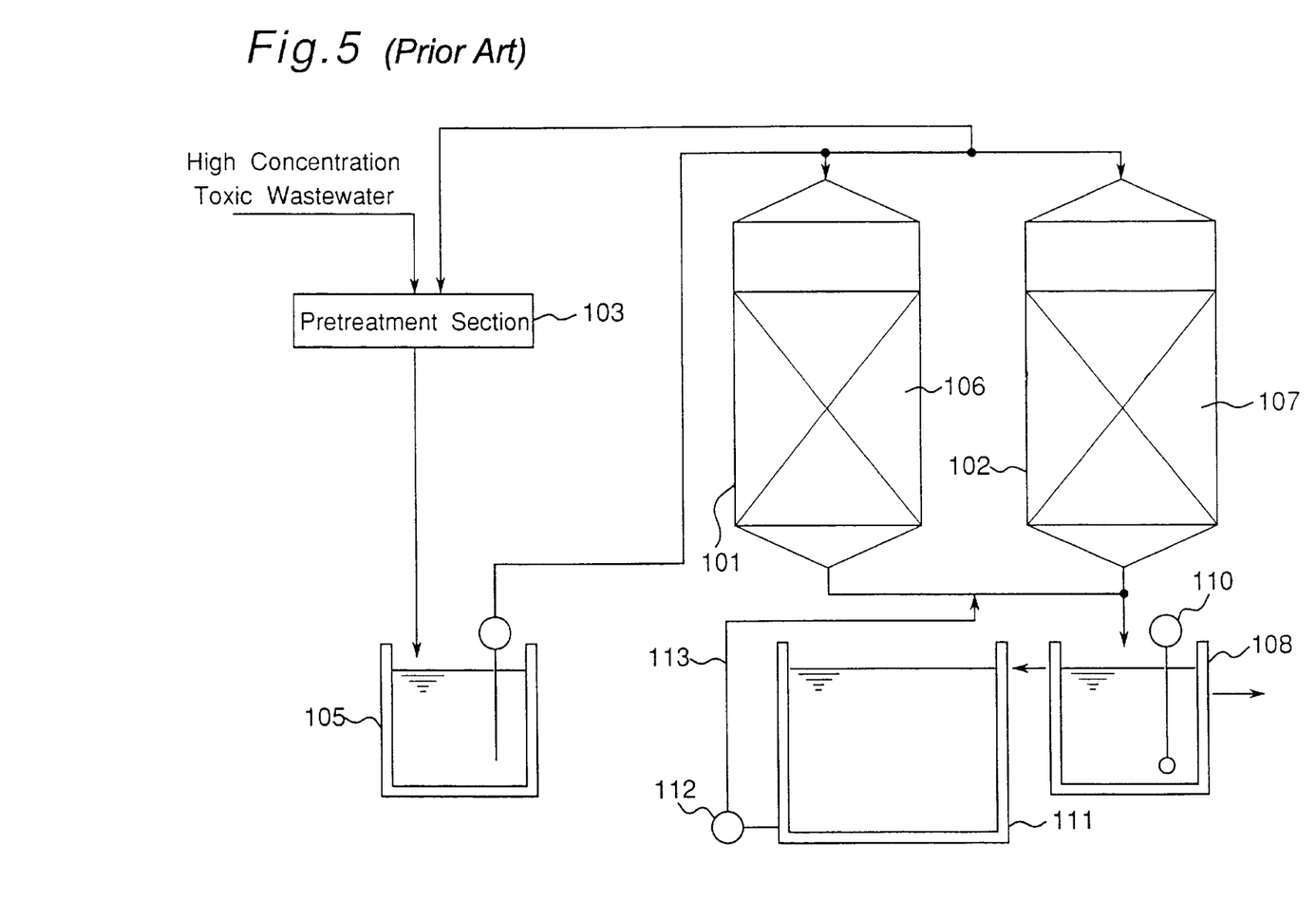
FIG. 5 is a block diagram schematically showing a conventional wastewater treatment apparatus including an activated carbon tower.

First, the way of utilization of activated carbon in the conventional wastewater treatment apparatus shown in FIG. 5 is explained. In this wastewater treatment apparatus, two activated carbon towers 101, 102 are filled with activated carbon, and only one of the two towers is supplied with water; but when the quality of the water treated in the one tower becomes lower than a target water quality, water supply is switched over to the other tower. The activated carbon in that activated carbon tower which requires regeneration of its activated carbon content is subjected to regeneration at a separate location. In this conventional apparatus, water feeding and regeneration are alternately carried out in the activated carbon towers 101, 102 in this way. Into the activated carbon towers 101, 102 is introduced treated water after its passage through a pretreatment section 103 and a water quality adjuster pit 105, as shown in FIG. 5. The activated carbon towers 101 and 102 include activated carbon layers 106 and 107 respectively. Treated water from the activated carbon towers 101, 102 is introduced into a treated water tank 108. The COD(Chemical Oxygen Demand) value of treated water in the treated water tank 108 is measured by a COD meter 110. Numeral 111 designates a back washing water tank, numeral 112 designates a back washing pump, and numeral 113 designates a backwash piping.

A wastewater treatment apparatus in which the physico-biological way of activated carbon utilization is used is called a bioactivated carbon treatment apparatus. This apparatus utilizes the adsorptive function of activated carbon relative to substances to be treated and the action of microorganisms grown on activated carbon for decomposition of the adsorbed substances. Examples of such bioactivated carbon treatment apparatus are described in Japanese Patent Application Laid-Open Publication No. 2-229595, and in Japanese Patent Application Laid-Open Publication No. 4-260497.

Figure 6:
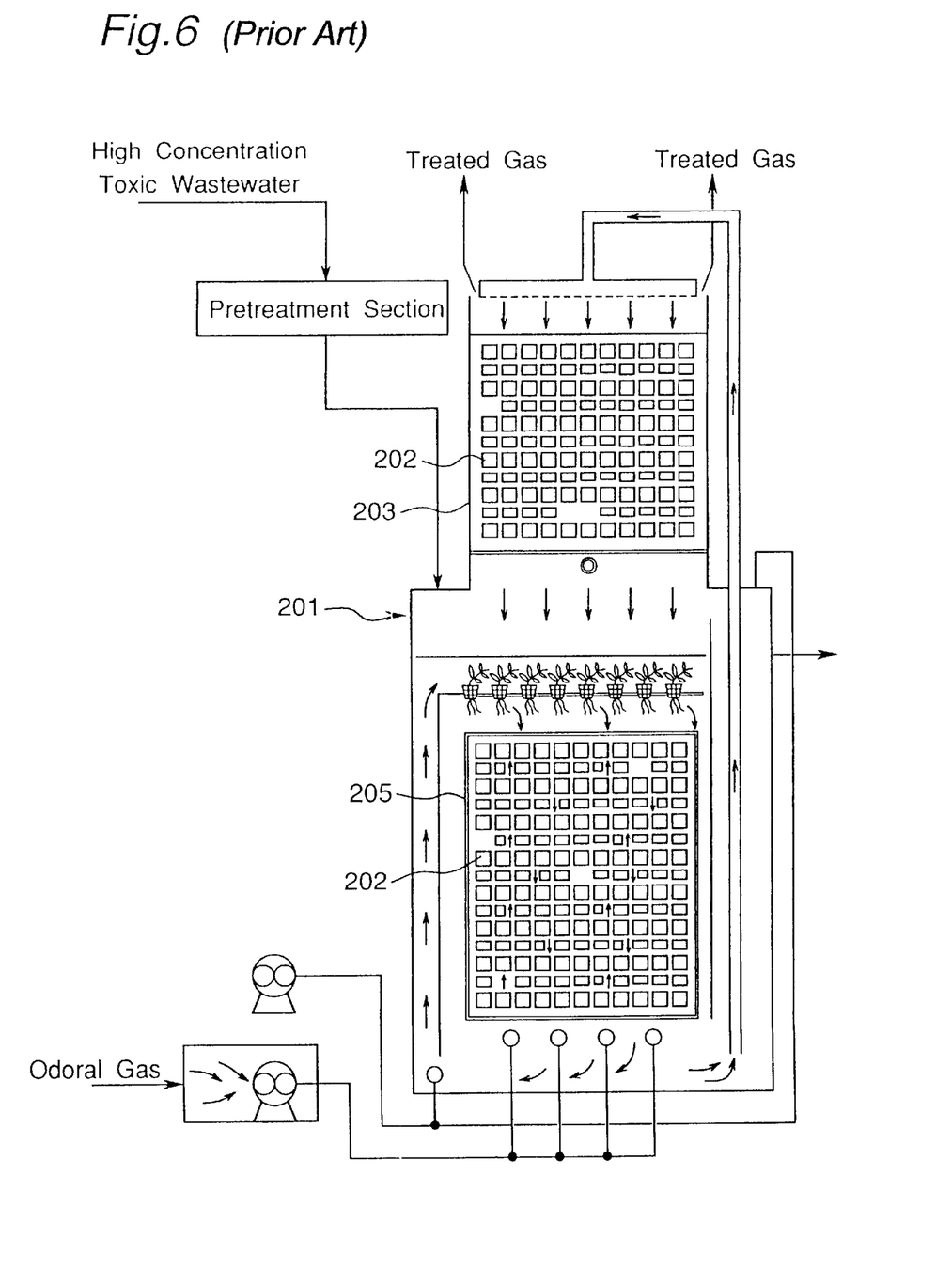
FIG. 6 is a block diagram schematically showing another type of conventional wastewater treatment apparatus.

FIG. 6 schematically shows a bioactivated carbon treatment apparatus by way of example. The apparatus includes a bioactivated charcoal tower 201 having charcoal and the like arranged therein in three dimensions. The bioactivated charcoal tower 201 utilizes charcoal 202 to highly treat organic matter in wastewater. The bioactivated charcoal tower 201 comprises an upper portion or sprinkling circulation section 203 and a lower portion or contact circulation section 205, which are both cubically filled with pieces of charcoal 202. In the tower 201, biofilms are caused to be formed by microorganisms on the charcoal pieces 202, and the water under treatment is circulated upward and downward directions so as to be microbially treated while in circulation.

In the practice of wastewater treatment at various industrial facilities, and semiconductor and liquid crystal plants, a recent trend is that high concentration toxic wastewater containing persistent surfactant which is discharged from them is treated by their own wastewater treating facility. High concentration toxic wastewater, for example, developer liquor containing wastewater discharged from existing semiconductor plants or liquid crystal plants contains tetramethylammonium hydroxide (hereinafter, referred to as TMAH) on the order of 2000 ppm to 10000 ppm. Developer liquor containing wastewater contains, in addition to TMAH, various types of persistent surfactants, alcohols, and colored resists. Specific examples of persistent surfactants contained in developer liquors are alkyl ammonium family surfactant and polyoxyethylene family surfactant.

At such facilities or plants, according to the quality of wastewater, various wastewater treatment techniques are employed including chemical treatment methods, such as neutralization, reaction and coagulation, biological treatment methods, such as biofilm, contact oxidation, activated sludge and special microbial treatment, and physical treatment methods, such as precipitation, filtration, adsorption, floatation and membrane treatment. Treatment stages using these chemical, biological and physical treatment techniques are, hereinafter generically referred to as pretreatment stage.

In reality, these different treatment methods are employed alone or in combination for treatment of high concentration toxic wastewater before the wastewater is discharged (see Japanese Patent Application Laid-Open Publications Nos. 1-9500 and 64-43306). Where stringent effluent standard regulations are in force, conventional wastewater treatment apparatus includes an activated carbon tower or a bioactivated carbon tower at a final operating stage. In this way, where wastewater treatment is carried out within company's own facility, wastewater is subjected to chemical treatment, biological treatment, and/or physical treatment over a long period of time, and the so treated water is finally treated in activated carbon tower or bioactivated carbon tower. In this manner, high-concentration, surfactant-containing toxic wastewater is treated to a quality level lower than statutory control value, the so treated water being then discharged.

Activated carbon placed in such activated carbon tower is rather expensive and involves high running cost because of its short service life prior to regeneration. Recently, therefore, a bioactivated carbon tower of the type earlier described, wherein organic matter is adsorbed by activated carbon on which microorganisms grow so that the microorganisms treat the adsorbed organic matter, is gaining popularity for use. With such bioactivated carbon tower, however, the trouble is that more than one cycle/day of backwash operation is required. Such known tower units, whether they are of the type incorporating activated carbon or of the type incorporating bioactivated carbon, are merely such that activated carbon granules only are placed therein, though various ideas are incorporated with respect to such tower arrangement.

When the construction of wastewater treatment equipment for such an industrial plant as earlier mentioned is undertaken in a local district having good natural environment, with attention directed toward the protection of the local environment, it is not satisfactory that care is simply used to strict observation of legal control values and local regulation values, for there may be some possibility that plant effluent may deleteriously affect the local environment. Therefore, it is necessary that any possible load exerted by such effluent upon the environment be economically reduced as much as possible. In other words, needs exist for a high-efficiency method and apparatus for wastewater treatment which will not cause any unfavorable change to the local environment, is safe in the interest of the local environment, is adapted for advanced wastewater treatment, provides for good cost economy and ease of maintenance, and requires less space for installation.

Meanwhile, conventional techniques for treatment of developer liquor-containing wastewater are simply intended to treat such wastewater so as to meet legal requirements with respect to TMAH(Tetramethyl Ammonium Hydroxide), surface active agents, alcohols, and resist. Therefore, even after wastewater treatment is carried out, trace amounts of persistent surface active agents and resist remain unremoved in treated water. Considerable time is required for decomposition of persistent surfactant. Therefore, if a trace amount of surfactant remains in treated water, it may be a cause of slight foaming of the treated water. A slight amount of resist is likely to color the waste water yellow. For treatment of developer liquor-containing waste water, no attention has been conventionally paid for development of a compact and economical arrangement for preventing such slight foaming and coloring of treated water.

As such, in such a conventional way of treatment as shown in FIG. 5, wherein treatment is carried out by physical adsorption in an activated carbon tower, regeneration of activated carbon is required, and therefore two or more activated carbon towers are required. Further, a backwash water tank, a backwash pump, backwash piping, and the like are required. This involves higher initial cost.

In a conventional bioactivated carbon tower, the water under treatment is subjected to a certain degree of advanced treatment. However, if advanced treatment is carried out only in the bioactivated carbon tower, clogging due to suspended matter is liable to occur, and this necessitates more than one time of backwashing operation every day. Water treatment cannot be carried out during backwashing operation, and this results in decreased volume of treated water. Also, backwashing requires adequate supply of water for the purpose. Further, as a matter of course, a backwash arrangement is required, which leads to higher initial cost. From the standpoint of treated water quality, with one tower alone, any satisfactory quality of treated water cannot be obtained when the water to be treated contains, in particular, persistent surfactants and coloring components, for the treatment of which sufficient time is required. In such a case, with one tower only, any sufficient water quality cannot be obtained, resulting in foaming occurrences. For purposes of treating high concentration wastewater, if a bioactivated carbon tower is provided at a final treatment stage, regeneration of the activated carbon is necessary. Therefore, provision of two or more bioactivated towers is required, resulting in higher initial cost.

In such a method for wastewater treatment using a bioactivated charcoal tower as illustrated in FIG. 6, there is no problem in respect of treatment capability, but it is necessary to arrange that contact reaction time be made longer or the size of the treatment apparatus be made larger because the absorptive capability of the charcoal is not so high.

SUMMARY OF THE INVENTION

Therefore, the present invention is directed to solving the foregoing problems with prior art method and apparatus. Accordingly, it is an object of the invention to provide a method and apparatus in which charcoal and activated carbon are used for wastewater treatment without any additional stage being required for backwashing and regeneration of such fillers; which can comprehensively treat any trace amounts of persistent surfactant and coloring matter contained in the wastewater; and which is compact in size, economical, and rational.

In order to accomplish the above object, the present invention provides a method for wastewater treatment comprising:
  introducing water to be treated that has been pretreated in a pretreatment section into a charcoal tank filled with charcoal to treat the water therein; and
  introducing the water from the charcoal tank into an activated carbon tower filled with activated carbon to treat the water therein.

The invention also provides an apparatus for wastewater treatment, comprising:
  a charcoal tank into which water to be treated is introduced and which is filled with charcoal; and
  an activated carbon tower into which water under treatment from the charcoal tank is introduced and which is filled with activated carbon.

According to the foregoing arrangement, the wastewater to be treated which has been pretreated in the pretreatment section is first biologically and physically treated in the charcoal tank which is filled with charcoal. Then, the water is biologically and physically treated in the activated carbon tower which is filled with activated carbon. Both the charcoal tank and the activated carbon tower perform their biological and physical functions for treatment of organic substances contained in the water under treatment.

The term "physical function" herein means the function of the charcoal in the charcoal tank for organic matter adsorption, and the function of activated carbon in the activated carbon tower for organic matter adsorption. More particularly, adsorption treatment effected by charcoal with respect to organic matter serves as a pretreatment, which is followed by adsorption treatment effected by activated carbon with respect to organic matter in the water under treatment. The adsorption treatment by activated carbon is more vigorous than that effected by charcoal in the preceding stage, so that a more complete treatment of organic matter through adsorption can be achieved.

In the activated carbon tower, the activated carbon is a bioactivated carbon. A charcoal or activated carbon having a physical treat function or adsorptive function with respect to organic matter, concurrently with a biological treat function or microbial decomposition function with respect to organic matter, is generally called bioactivated charcoal or bioactivated carbon. Bioactivated carbon has greater capability of organic matter decomposition through microbial growth on its surface and interior than its capability of organic matter adsorption. Therefore, the bioactivated carbon need not be regenerated. The activated charcoal serves concurrently as a biological filter. The action of microorganisms grown on the charcoal for decomposition of organic matter, and the action of microorganisms grown on the activated carbon for decomposition of organic matter, are meant by the above termed "biological function".

More particularly, in the charcoal tank, organic substances in the water under treatment are biologically treated as a first stage treatment by utilizing the biofilm forming behavior of microorganisms grown on the surface, as well as in the interior, of the charcoal, a porous material. Next, in the activated carbon tower, organic substances adsorbed by the activated carbon are completely decomposedly treated as a second stage treatment by microorganisms grown on the surface, inclusive of interior surface, of the activated carbon, a porous material.

In this connection it is interesting to note that since charcoal is a material produced from wood, a material originating from a tree, it contains various kinds of minerals, as nutriments, drawn from soil. As pieces of charcoal packed in the charcoal tank are aerated under water, such mineral contents, as effective components, are gradually dissolved into the water to provide trace elements required for active microbial growth, thereby aiding microorganisms in growth. This also contributes to active propagation of microorganisms on the activated carbon in the subsequent stage or activated carbon tower.

According to the invention, therefore, through vigorous propagation of microorganisms grown on the surface of the activated carbon as vitalized by the supply of nutrient minerals from the charcoal, organic substances physically adsorbed by the activated carbon can be completely microbially treated without regeneration being required of the activated carbon.

Charcoal or activated carbon is a porous material having a large number of minute pores with a wide pore size range of the order of from several micron to several hundred micron. Therefore, the charcoal and activated carbon are ready to invite propagation of many kinds of microorganisms thereon according to different pore sizes. As a result of propagation of many kinds of microorganisms, biofilm layers are formed in the interior of the charcoal and of the activated carbon. Such biofilms adsorb chemical substances, such as persistent surfactants and resist components, which are generally less biodecomposable, and are capable of microbial decomposition of those substances. The water under treatment, while held in circulation through such biofilm layers formed on the surface of the charcoal, is biologically filtered through the biofilms.

In the pretreatment section, minute suspended matter and suspended or colloidal organic substances in the water to be treated are treated by (1) screening or (2) pressure floatation or coagulating sedimentation, but the treatment in this pretreatment section is not complete. Therefore, the water to be treated which has passed through the pretreatment section still contains 3 to 15 ppm of suspended or colloidal matter which cannot pass through a fine mesh filter paper. However, such residual minute suspended matter and suspended or colloidal organic substances are biologically filtered in the charcoal tank which has biofilm layers of a first stage formed therein. As a result, in the charcoal tank, any minute suspended matter and suspended or colloidal organic matter which may clog the activated carbon in the activated carbon tower are positively treated. Therefore, backwashing in the activated carbon tower in which are formed second stage biofilm layers is no longer required.

According to an embodiment, in the wastewater treatment apparatus, the charcoal is "Binchotan" charcoal.

In this embodiment, the charcoal tank is packed with pieces of "Binchotan" charcoal. The "Binchotan" charcoal (a kind of white charcoal) has a specific gravity of more than 1 and is therefore submerged under water through sedimentation in the charcoal tank. The "Binchotan" charcoal is little liable to breakage even under vigorous aeration. Unlike any other type of charcoal, therefore, the "Binchotan" charcoal does not cause any increase in the concentration of suspended matter in the water under treatment. Further, the "Binchotan" charcoal serves as an immobilized carrier for microorganisms to provide a stable location for microbial growth and propagation. The surface of the "Binchotan" charcoal is ready to invite formation of biofilms which are capable of treatment of minute suspended matter and suspended or colloidal organic matter in the water under treatment. Thus, any possible clogging of activated carbon can be prevented.

An embodiment comprises an oxygen dissolution tank which receives water to be treated from the charcoal tank and is adapted to cause oxygen to be dissolved into the water to be treated before the water is introduced into the activated carbon tower, the charcoal tank including an aeration device.

In the wastewater treatment apparatus of this embodiment, the interior of the charcoal tank can be aerated by the aeration device. Therefore, aerobic microorganisms can be constantly kept within the charcoal tank. The aeration serves to aerate the interior of the charcoal tank. Also, the aeration serves to invite positive elution of minerals as nutriments from the charcoal in the charcoal tank. The oxygen dissolution tank functions to increase the dissolved oxygen concentration of the water under treatment so as to enable the activity of aerobic microorganisms to be maintained in the next stage or bioactivated carbon tower so that the propagation of microorganisms therein can be enhanced.

The essential point of this embodiment is that by controlling the amount of oxygen dissolved into the water under treatment in the oxygen dissolution tank it is possible to control the amount of dissolved oxygen in the water to be introduced from the charcoal tank into the activated carbon tower. By so arranging it is possible to control the activity of aerobic microorganisms in the activated carbon tower.

An embodiment comprises a return system for returning a portion of the water under treatment from the activated carbon tower to the charcoal tank.

The waste treatment apparatus of this embodiment is such that a portion of the water under treatment can be returned from the activated carbon tower which is packed with activated carbon to the charcoal tank which is packed with charcoal. Therefore, by adjusting a quantity of such return it is possible to select a mode of operation according to a quality of the water under treatment. In the case of such return, the return water is replenished with minerals as nutriments which are eluded from the charcoal in the charcoal tank. As the quantity of return water is increased, water supply to the activated carbon tower is proportionally increased, with the result that the time for retention in the activated carbon tower is reduced. Accordingly, dissolved oxygen will extend to a lower portion of the activated carbon tower (if the retention time is longer, $O_2$ consumption in the upper portion of the tower is increased so that microorganisms are unlikely to grow in the lower portion). Because of these facts, propagation of aerobic microorganisms is enhanced throughout the tower which is packed with activated carbon. This, coupled with the inherent adsorption function of the activated carbon, results in considerable improvement in biophysical capability of organic matter treatment. Therefore, adsorption of organic matter and decomposition of organic matter by vigorous microbial action proceed in parallel and, as a result, the size of the tower itself can be made smaller.

An embodiment comprises a control system for controlling the quantity of the water to be treated for introduction into the charcoal tank, and the quantity of water returned from the activated carbon tower to the charcoal tank.

According to this embodiment, where the quality of the to-be-treated water from the pretreatment section is considerably favorable, circulation of return water is not required and, therefore, operation may be carried out without return water. In the case where water return is made during normal operation, the time for water retention in the bioactivated carbon tower is considerably reduced so that dissolved oxygen can be supplied to a lower portion of the tower, it being thus possible to exercise control so as to enhance microbial performance in the tower.

According to the invention, as described above, it is possible to provide a method and apparatus in which charcoal and activated carbon are used for wastewater treatment without any additional stage being required for backwashing and regeneration of such fillers; which can comprehensively treat any trace amounts of persistent surfactant and coloring matter contained in the wastewater; and which is compact in size, economical, and rational.

The results of experiments conducted on a pilot plant scale for wastewater treatment in accordance with the present invention tell that by carrying out the following two stage treatment after pretreatment done with respect to high concentration wastewater, namely, (1) treatment by "Binchotan" charcoal (bioactivated charcoal), and (2) treatment by activated carbon (bioactivated carbon), three remarkable effects can be achieved, that is, first, the backwashing stage for the activated carbon tower is no longer necessary; second, the service life of the activated carbon can be exceptionally extended and regeneration of activated carbon is no longer necessary; and third, the size of the activated carbon tower can be made smaller.

More specifically, first, the backwashing stage in the activated carbon tower is rendered unnecessary because of the filtration effected by biofilms formed on the surface of the charcoal ("Binchotan" charcoal); second, organic matter which would determine the time for regeneration of activated carbon is previously adsorbed by "Binchotan" charcoal. Thereafter, the so-adsorbed organic substances are decomposed by microorganisms propagated on the charcoal ("Binchotan" charcoal). The pretreatment effected by the charcoal ("Binchotan" charcoal) results in reduced needs for activated carbon that is necessary to adsorb organic matter still present after the pretreatment. Additionally, there is an unexpectedly obtained new finding such that minerals (nutriment) eluted from the packed charcoal ("Binchotan" charcoal) in the charcoal treatment stage can exceptionally enhance the activity of microorganisms propagated in the next treatment stage, i.e., the bioactivated carbon tower, with the result that the bulk of the adsorbed organic matter is decomposed in a rational and positive fashion.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

One embodiment of the present invention will now be described in detail with reference to the accompanying drawings.

Figure 1:
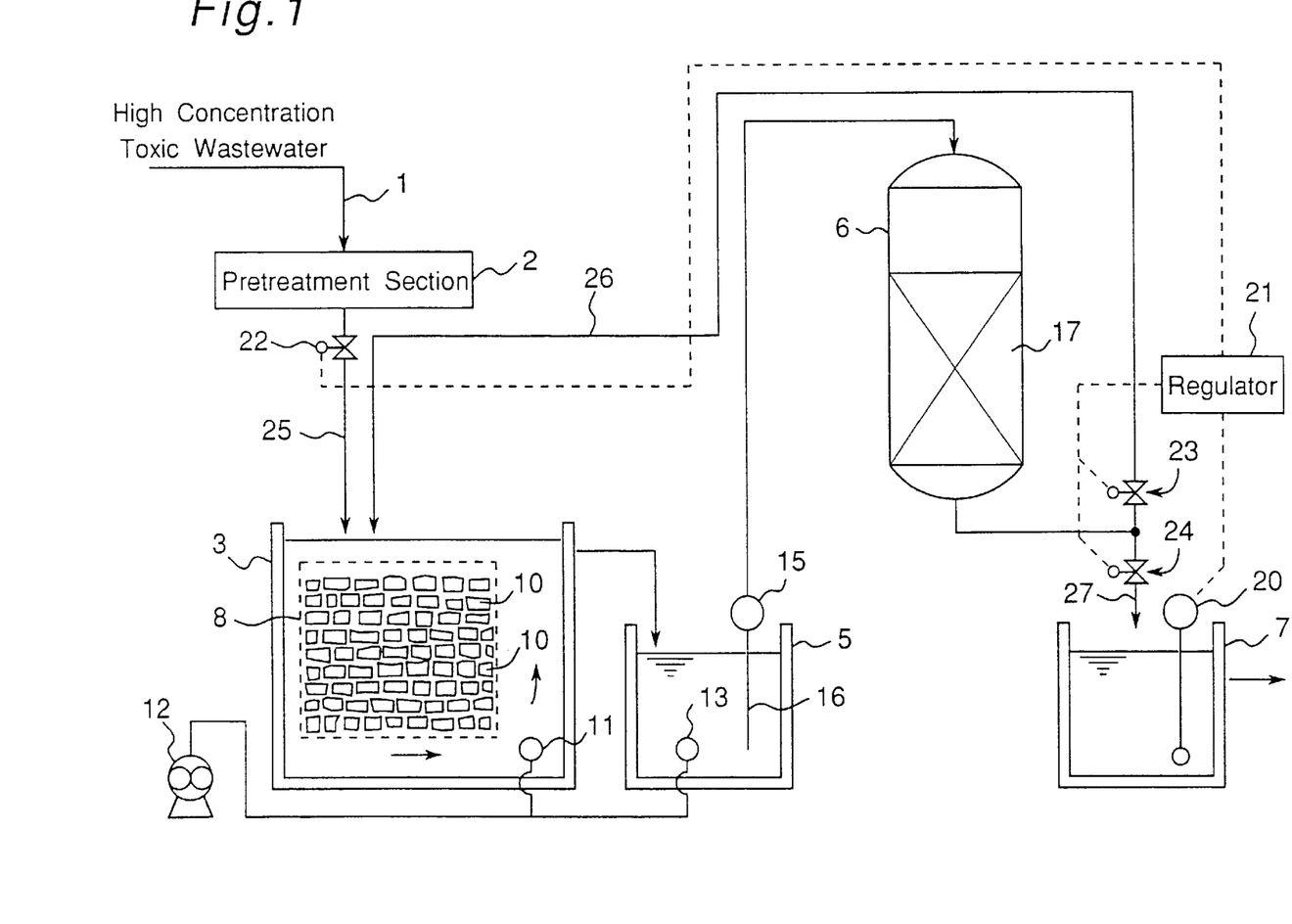
FIG. 1 is a block diagram schematically showing a wastewater treatment apparatus of an embodiment of the invention which includes in combination a bioactivated charcoal tank and a bioactivated carbon tower.

FIG. 1 shows a wastewater treatment apparatus embodying the invention. The apparatus includes a pretreatment section 2 to which is connected a pipe 1, a bioactivated charcoal tank 3, an oxygen dissolution tank 5, a bioactivated carbon tower 6, and a treated water tank 7.

The pretreatment section 2 is designed to receive high concentration toxic wastewater through the pipe 1 and is operative to carry out pretreatment of the wastewater.

The charcoal tank 3 is designed to receive water to be treated from the pretreatment section 2 and has charcoal pieces 10 packed in a charcoal housing basket 8. The charcoal pieces 10 are vertically piled up in layers. The charcoal tank 3 has an aeration pipe 11 disposed adjacent to the bottom of the tank. The aeration pipe 11 functions as an aeration means and is connected to a blower 12. The housing basket 8 may be a resin mesh-like container and, of course, may be a stainless steel housing basket.

Figure 2A:
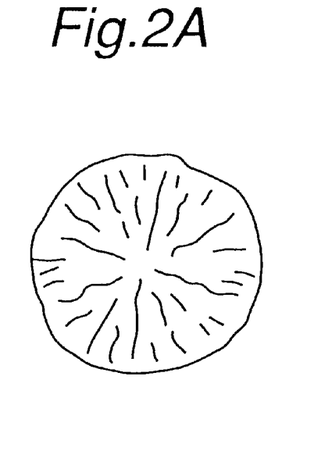
FIG. 2A is a front view of a piece of charcoal filled in the charcoal tank of the embodiment.
Figure 2B:
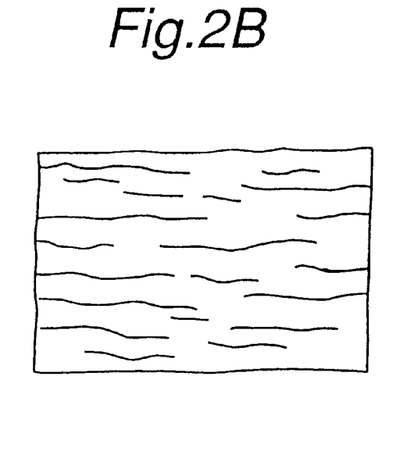
FIG. 2B is a side view of the charcoal.

In the present embodiment, for charcoal 10, "Binchotan" charcoal is selected which is not liable to break due to vigorous aeration. "Binchotan" charcoal is a charcoal of the kind having a time-honored background of production in Japan, and more specifically it is a white charcoal produced from a kind of broad-leaved tree called "Ubamegashi". White charcoal is produced through the process of carbonization at a temperature of about 1000° C., and is ranked as a high-temperature carbonized charcoal. The "Binchotan" charcoal selected for use in the present embodiment has a diametrical range of 4 cm to 6 cm and a length of 5 cm or more, as shown in FIGS. 2A and 2B. This enables good contact agitation of the water under treatment relative to the charcoal 10 as filler material within the bioactivated charcoal tank 3. As long as the "Binchotan" charcoal has a diameter of the order of from 4 to 6 cm, there is no possibility of clogging in the event that for some reason there should occur abnormal growth of microorganisms in the tank.

The under-treatment water from the charcoal tank 3 is introduced into the next stage tank, i. e., the oxygen dissolution tank 5. The oxygen dissolution tank 5 includes an aeration pipe 13 disposed adjacent to the bottom of the tank. A suction pipe 16 from a water delivery pump 15 extends into the oxygen dissolution tank 5 and to a location adjacent to the bottom of the tank.

The water under treatment from the oxygen dissolution tank 5 is introduced into the bioactivated carbon tower 6 through the water delivery pump 15. The bioactivated carbon tower 6 has an activated carbon bed 17 placed therein. The water under treatment from the bioactivated carbon tower 6 is introduced into the treated water tank 7. The treated water tank 7 has a COD (Chemical Oxygen Demand) meter 20 for measuring the COD of the water. The COD meter 20 is electrically connected to a regulator 21, which in turn is electrically connected to solenoid controlled valves 22, 23, and 24. The solenoid controlled valve 22 is fitted to a pipe 25 interconnecting the pretreatment section 2 and the bioactivated charcoal tank 3. The solenoid controlled valve 23 is fitted to a return pipe 26 extending from the bioactivated carbon tower 6 to the charcoal tank 3. The solenoid controlled valve 24 is fitted to an introduction pipe 27 extending from the bioactivated carbon tower 6 to the treated water tank 7.

Figure 3:
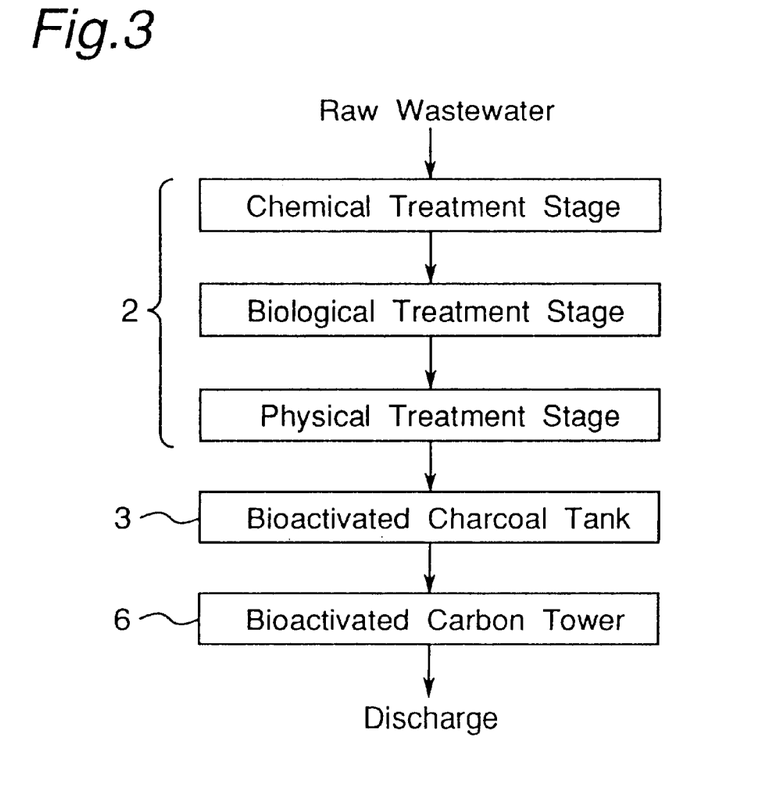
FIG. 3 is a flow diagram for explaining the flow of operation with respect to the embodiment.

One example of high concentration toxic wastewater to be introduced into the pretreatment section 2 of the wastewater treatment apparatus of the above described configuration is a developer liquor-containing wastewater which includes, in particular, coloring components such as resist and surfactant. The pretreatment section 2, as FIG. 3 shows, is designed to carry out one of chemical treatment, biological treatment, and physical treatment operations alone, or to carry out these operations in combination.

The water under treatment from the pretreatment section 2 is introduced into the bioactivated charcoal tank 3. In the bioactivated charcoal tank 3, air as fed to the. eration pipe 11 from the blower 12 is discharged from the aeration pipe 11. The air so discharged flows upward to produce an upward current so that the water under treatment is caused to circulate time and again within the charcoal tank 3 while having contact with charcoal 10. As the water under treatment contacts the charcoal 10, organic substances present in the water are treated by microorganisms grown on the surface of charcoal 10 as well as in the interior thereof. Further, since charcoal 10 has a physical adsorptive function relative to organic substances, it adsorbs organic substances present in the water. In addition, such substances are subjected to microbial decomposition by microorganisms and, particularly, biofilms grown in the interior of charcoal 10.

Since charcoal 10 is a material produced from natural wood, it contains mineral substances which the wood, as a tree, had sucked for its nutrition from soil. Such mineral content, i. e., ash content, of the charcoal serves as a source of mineral substances or nutrients necessary for microbial growth. Such mineral substances include calcium, potassium, phosphorus, magnesium, silicon, aluminum, etc., and they are present in the form of carbonate or the like that is readily soluble in water. Minute amounts of such minerals, as eluted from charcoal 10 and dissolved in water, function effectively for positive propagation of microorganisms. Aeration by the aeration pipe 11 serves for positive elution of mineral substances, as microbial nutrients. from charcoal 10 in the bioactivated charcoal tank 3.

In case that the quality of pretreated water introduced into the bioactivated charcoal tank 3 is unfavorable, the time for contact reaction, that is, the retention time in the charcoal tank 3 is set at 3 hours.

In normal operation, the flow rate of water returned from the bioactivated carbon tower 6 to the bioactivated charcoal tank 3 is set at the same flow rate as that of pretreated wastewater from the pretreatment section 2 which is introduced into the bioactivated charcoal tank 3. During such normal operation, the time for contact reaction in the bio-activated charcoal tank 3 is set at 1.5 hours because water under treatment is returned from the bioactivated carbon tower 6 to the charcoal tank 3.

Next, water under treatment from the bioactivated charcoal tank 3 is allowed to flow into the oxygen dissolution tank 5 by overflowing. Aeration pump 13 and water delivery pump 15 are disposed in the oxygen dissolution tank 5 in which dissolved oxygen is maintained to a saturated concentration by air discharged from the aeration pump 13. The role of the oxygen dissolution tank 5 is to maximize the concentration of dissolved oxygen in the water under treatment thereby to enable the next operating stage, that is, bioactivated carbon tower 6 to be kept in an aerobic condition. The reason why the oxygen dissolution tank 5 is installed between the charcoal tank 3 and the bioactivated carbon tower 6 is that it is necessary to compensate for the oxygen consumed in the charcoal tank 3. Another reason is that it is necessary to avoid aeration in the bioactivated carbon tower 6 because such aeration may cause breakdown of microbial layers therein. The time for retention in the oxygen dissolution tank 5 is set to 0.2 hour in the case of water return being not carried out, and to 0.1 hour in the case of water return being carried out.

The water under treatment, after the dissolved oxygen concentration therein has been maximized in the oxygen dissolution tank 5, is introduced into the bioactivated carbon tower 6 by the water delivery pump 15. The activated carbon bed 17 in the bioactivated carbon tower 6 is packed with activated carbon masses. For the activated carbon so packed, a coal family activated carbon is used in the present embodiment. It is understood, however, that activated carbon for use is not limited to the coal family type, but may be coconut shell family, or charcoal family. In configuration, the activated carbon may be particle or granular. The coal type activated carbon used for the present purpose is a product available from Mitsubishi Kagaku K. K. under the trade name of "DIAHOPE".

Water supply from the water delivery pump 15 to the bioactivated carbon tower 6 is made at an hourly volume corresponding to two times the volume of activated carbon in the bioactivated carbon tower 6 in the case where water return is carried out. In the case where water return is not carried out, such water supply is made at an hourly volume equal to the volume of activated carbon in the bioactivated carbon tower 6. In other words, where no water return is made, the time for water retention is set to 1 hour, and where water return is made, the retention time is 0.5 hour.

The water supplied from the water delivery pump 15 to the bioactivated carbon tower 6 for treatment therein had already been aeratedly agitated in the bioactivated charcoal tank 3. Therefore, at the water delivery pump 15 the water introduced into the charcoal tank 3 from the pretreatment section 2 and the return water from the bioactivated carbon tower 6 to the charcoal tank 3 (cyclic water) are already in completely mixed condition.

In case that the water to be treated consists of water from the pretreatment section 2 and does not include return water, the time for contact reaction in the bioactivated carbon tower 6 is set to 1 hour as already mentioned. In the bioactivated carbon tower 6, organic matter is adsorbed by bioactivated carbon in the activated carbon bed 17, and the so adsorbed organic matter is decomposed by microorganisms grown on the bioactivated carbon.

In the mode of operation with respect to the present embodiment, as stated above, 50% of the water discharged from the bioactivated carbon tower 6 is returned to the bioactivated charcoal tank 3 via the solenoid controlled valve 23. The remaining 50% of the water, as treated water, is caused to flow into the treated water tank 7 via the solenoid controlled valve 24.

In case that the COD (Chemical Oxygen Demand) value of the water in the treated water tank 7 should exceed a target value (12 ppm), the regulator 21, in response to a signal from the COD meter 20, causes the; solenoid controlled valve 23 to be fully opened, and the solenoid controlled valve 24 to be fully closed. Thereby, all of water discharged from the bioactivated carbon tower 6 is returned to the bioactivated charcoal tank 3. Thus, the water is again caused to sequentially pass through the charcoal tank 3, oxygen dissolution tank 5, and bioactivated carbon tower 6 for further treatment. In the above conjunction, it is needless to say that the solenoid controlled valve 23 is fully closed to prevent entry of water from the pretreatment section 2 into the charcoal tank 3.

In case that the COD value of the water in the treated water tank 7 is substantially lower than the target value (12 ppm), for example, 5 ppm, the regulator 21, in response to a signal from the COD meter 20, causes the solenoid controlled valve 24 to be fully opened, and the solenoid controlled valve 23 to be fully closed. The solenoid controlled valve 22 is kept open full. Through such open/close control of solenoid controlled valves 22, 23, 24 according to the COD value in the treated water tank 7 it is possible to regulate the quantity of water return so that the quality of treated water to be obtained finally from the treated water tank 7 can be stabilized.

Features of the mode of operation with respect to the present embodiment may be summarized as follows. First, backwash operation in the activated carbon tower 6 is unnecessary because of filtration by biofilms formed on the surface of charcoal ("Binchotan" charcoal) 10. Second, organic substances which would determine the time for regeneration of activated carbon 17 are previously adsorbed by the charcoal 10 ("Binchotan"). Thereafter, the so-adsorbed organic substances are decomposed by microorganisms propagated on the charcoal 10 ("Binchotan" charcoal). The pretreatment effected by the charcoal 10 ("Binchotan" charcoal) results in reduced needs for activated carbon now that activated carbon is only necessary to adsorb organic matter still present after the pretreatment. Moreover, minerals (nutriment) eluted from the packed charcoal 10 ("Binchotan" charcoal) in the charcoal treatment stage can exceptionally enhance the activity of microorganisms propagated in the next treatment stage, i.e., the bioactivated carbon tower 6, with the result that the bulk of the adsorbed organic matter is decomposed in a rational and positive fashion. Therefore, the regeneration stage for the activated carbon tower 6 which has been required in the prior art is no longer necessary.

Figure 4:
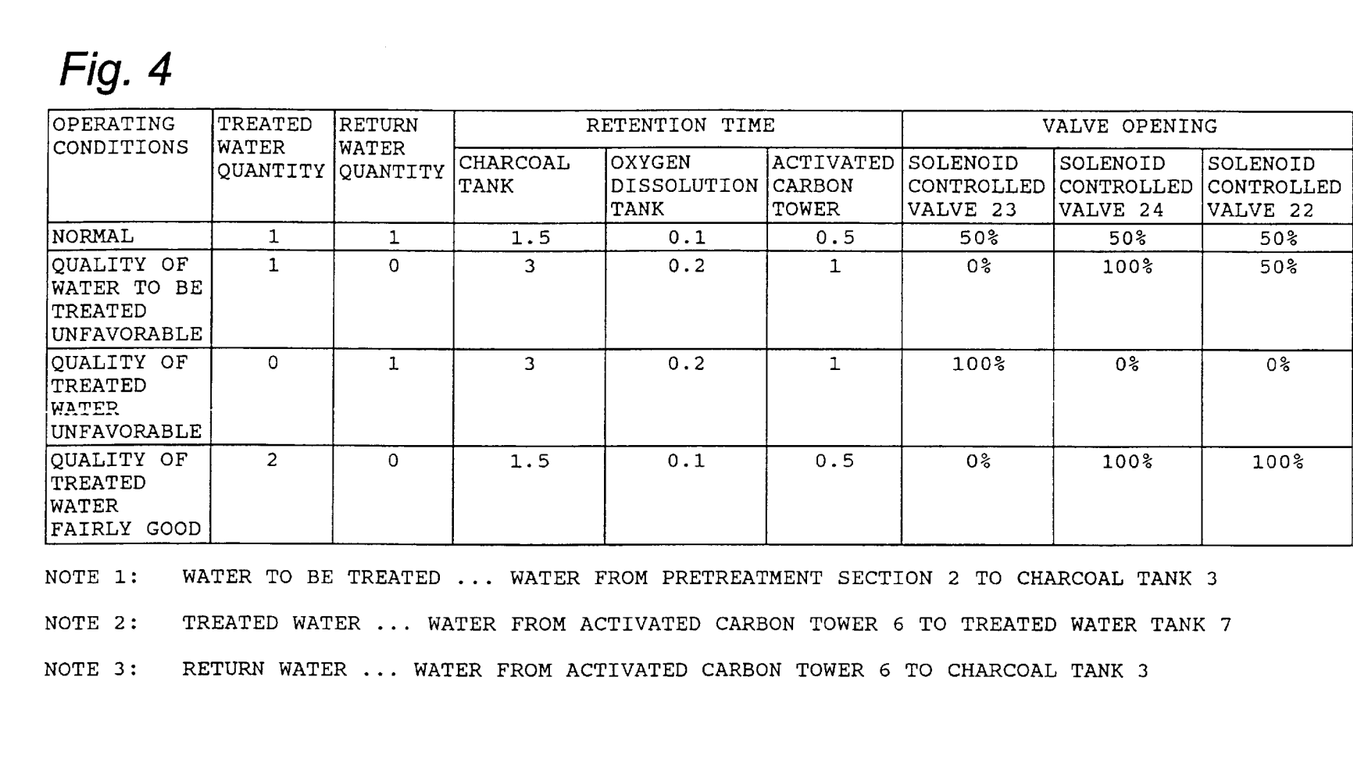
FIG. 4 is a chart for explaining operating conditions with respect to the embodiment.

Modes of operation may be summarized as enumerated below, as also tabulated in FIG. 4.

(1) During normal operation, with respective openings of solenoid controlled valves 22, 23, 24 set at 50%, 50%, 50%, the quantity of inflow of the water to be treated from the pretreatment section 2 into the charcoal tank 3 to the quantity of return water from the bioactivated carbon tower 6 to the charcoal tank 3 was set in the ratio of 1 to 1. At the same time, the time of retention in the charcoal tank 3 was set at 1.5 hours, the time of retention in the oxygen dissolution tank 5 at 0.1 hour, and the time of retention in the bioactivated carbon tower 6 at 0.5 hour.

(2) When the quality of the-to-be-treated water discharged from the pretreatment section 2 was unfavorable, respective openings of solenoid controlled valves 22, 23, 24 were set at 50%, 0%, 100%, whereby the quantity of return water to the charcoal tank 3 was set to zero. At the same time, each respective retention time was set to two times that during normal operation, thereby to improve the quality of water.

(3) When the quality of water discharged from the bioactivated carbon tower 6 was unfavorable, respective openings of solenoid controlled valves 22, 23, 24 were set at 0%, 100%, 0%, the inf low quantity of water-to-be-treated into the charcoal tank 3 was set to zero, and the quantity of return water to the charcoal tank 3 was set at same quantity as that during normal operation thereby to prevent treated water from being discharged toward the treated water tank 7. In this way, improvement was made in water quality.

(4) When the quality of treated water discharged from the bioactivated carbon tower 6 was considerably good, respective openings of solenoid controlled valves 22, 23, 24 were set at 100%, 0%, 100%. By so doing, the quantity of return water was reduced to zero, and at the same time the inflow quantity of the water to be treated from the pretreatment section 2 to the charcoal tank 3 was increased to two times as much as that during normal operation. In this way, treated water output was enhanced.

According to the present embodiment, by changing the course of treatment and respective times of retention in tanks 3, 5, and tower 6 according to the quality of water to be treated as wall as the quality of treated water, it is possible to improve the efficiency of treatment while preventing changes in the quality of the resulting treated water.

EXPERIMENTAL EXAMPLE

Next, one experimental example based on the above described embodiment will be explained.

Water to be treated was introduced into a bioactivated charcoal tank 3 of 0.7 m×0.7 m×1.0 m, an oxygen dissolution tank 5 of 0.4 m×0.4 m×0.4 m, and a bioactivated carbon tower 6 having a diameter of 0.25 m and a height of 1.0 m, and trial operation was carried out for about 3 months.

At an initial stage of trial operation, charcoal 10 in the bioactivated charcoal tank 3 showed no change, but something like a biofilm was slightly formed on the surface of the charcoal after lapse of about one month. The biofilm was not so thick as a biofilm which could be generally seen in conventional wastewater treatment operation of the rotary disc type, but presented itself in a typical thin biofilm configuration on charcoal 10.

After the end of the trial operation, the quality of water prior to entry into the bioactivated charcoal tank 3 and the quality of treated water at the outlet of the bioactivated carbon tower 6 were measured over a period of three days. Measurement data thus collected are summarized as follows.

|  | Quality at bioactivated charcoal tank inlet | Quality at bioactivated charcoal tank outlet | Quality at bioactivated carbon tower outlet |
| --- | --- | --- | --- |
| pH | 7.4 | 7.4 | 7.3 |
| COD | 50 ppm or less | 26 ppm or less | 10 ppm or less |
| TOC | 40 ppm or less | 22 ppm or less | 11 ppm or less |

-continued

|  | Quality at bioactivated charcoal tank inlet | Quality at bioactivated charcoal tank outlet | Quality at bioactivated carbon tower outlet |
|---|---|---|---|
| BOD | 40 ppm or less | 20 ppm or less | 10 ppm or less |
| SS | 20 ppm or less | 6 ppm or less | 5 ppm or less |
| Cationic surfactant | 2 ppm or less | 1.6 ppm or less | 0.5 ppm or less |
| Anionic surfactant | 2 ppm or less | 1.6 ppm or less | 0.2 ppm or less |
| Chromaticity | 160 degress or less | 110 degress or less | 5 degrees or less |

As shown above, the bioactivated charcoal tank 3, as a biological filter tank, exhibited high removal efficiency with respect to SS(Suspended Solids) in particular (SS decreased from 20 ppm or less to 6 ppm or less). Thus, the occurrence of clogging due to SS in the next treatment stage, i.e., the bioactivated carbon tower 6, can be well prevented. Therefore, backwashing operation in the bioactivated carbon tower 6 is unnecessary.

At the same time, in the bioactivated charcoal tank 3, as a biological filter tank, COD was decreased to the order of not more than 50 ppm through the order of not more than 26 ppm, TOC(Total Organic Carbon) was decreased to the order of not more than 40 ppm through the order of not more than 11 ppm, and BOD(Biological Oxygen Demand) was decreased to the order of not more than 22 ppm through the order of not more than 20 ppm, as shown above. This bioactivated charcoal tank 3 has the following functions; pretreatment for activated carbon, supply of minerals; and supply of microfine suspended microbes to the bioactivated carbon tower 6.

As may be appreciated from the above tabulation, the bioactivated carbon tower 6, packed with activated carbon having much higher adsorptivity than charcoal 10, exhibited good removal efficiency with respect to the following items in particular: cationic surfactant was reduced to not more than 0.5 ppm, anionic surfactant was reduced to not more than 0.2 ppm, and chromaticity was reduced to not more than 5 degrees. It is noted in this connection that cationic surfactant, anionic surfactant, and chromaticity are items which cannot be so much removed in the bioactivated charcoal tank 3. COD, TOC, and BOD were also substantially reduced by adsorptive action of activated carbon packed in the bioactivated carbon tower 6.

In the prior art, the performance of an activated carbon tower was such that the adsorptivity of activated carbon with respect to organic matter was greater than the decomposition capability of biofilms formed on activated carbon with respect to organic matter. In contrast, according to the present invention, the activated carbon tower is supplied with minerals and microorganisms so that the tower has increased capability of decomposing organic substances. Therefore, the necessity of activated carbon regeneration has now been eliminated. According to the invention, charcoal and activated carbon which are apparently different in adsorptivity are used to enable the bioactivated charcoal tank 3 to perform microbial treatment consisting mainly of biofilm treatment and some adsorption treatment and also to supply microorganisms and minerals to the bioactivated carbon tower 6 so that regeneration of activated carbon is not required even when much load is applied upon the activated carbon.

Another series of study based on experiments conducted using a small-scale apparatus of the same construction as the present embodiment proved that the apparatus required no regeneration of whichever of charcoal or activated carbon over a long period of time, say, two years. In contrast, with the conventional wastewater treatment apparatus as shown in FIG. 5, regeneration of activated carbon was required once every three months.

As is apparent from the foregoing description, according to the method for wastewater treatment of the invention, water to be treated which has been pretreated in the pretreatment section is introduced into a charcoal packed charcoal tank for treatment therein, and then the water from the charcoal tank is introduced into an activated carbon-packed activated carbon tower for treatment therein.

The apparatus for wastewater treatment according to the invention includes a charcoal tank designed to receive water to be treated which is packed with charcoal and an activated carbon tower designed to receive water to be treated from the charcoal tank which is packed with activated carbon.

According to the invention, water to be treated that has been pretreated is first treated in the (bioactivated) charcoal tank which is packed with charcoal, and then the so-treated water is introduced into the activated carbon tower which is packed with activated carbon, for being treated therein.

Therefore, according to the invention, the water to be treated is first treated through adsorption of target substances including organic matter by the charcoal in the bioactivated charcoal tower, and is then subjected to treatment through decomposition of target substances including organic matter in the wastewater by microorganisms propagated on the charcoal. In this way, target substances, including organic matter, present in the water to be treated, or wastewater, can be physico-biologically treated in the bioactivated charcoal tank.

Third, target substances remaining unabsorbed, including organic matter, are adsorbed by activated carbon in the bioactivated carbon tower. Fourth, the target substances including organic matter in the wastewater are decomposed by microorganisms propagated actively on the activated carbon through nourishment by minerals eluted from the charcoal.

By virtue of these features, target substances including organic substances present in the water to be treated, that is, wastewater can be positively physico-biologically treated in two treatment stages (charcoal tank and activated tower).

Biofilm layers are formed in the interior of the charcoal and of the activated carbon as a result of propagation of many kinds of microorganisms therein. Such biofilms adsorb chemical substances, such as persistent surfactants and resist components, which are generally less biodecomposable, and are capable of microbial decomposition of those substances. Further, because of the fact that charcoal is much less expensive than activated carbon, the present invention provides for considerable saving in both initial cost and running cost in contrast to the prior art arrangement shown in FIG. 5 wherein two or more activated carbon towers are required which use activated carbon alone and wherein regeneration of activated carbon is required.

Also, the present invention provides good advantage over the prior art arrangement (bioactivated charcoal tower) in that the time for contact reaction after pretreatment stage can be reduced to an exceptionally lower level (about one third) and, therefore, that some reasonable size reduction can be achieved. More specifically, whereas the prior art arrangement requires a contact reaction time of 10 hours in the case of wastewater inflow of 1 cubic meter per hour, the present invention only requires a contact reaction time of 3 hours in the charcoal tank and a contact reaction time of 1 hour in the activated carbon tower.

According to an embodiment, in the wastewater treatment apparatus, the charcoal is "Binchotan" charcoal. That is, the bioactivated charcoal tank is packed with "Binchotan", a sturdy charcoal produced from "Ubamegashi", which is not liable to breakage under vigorous aeration. Moreover, "Binchotan" charcoal has a specific gravity of more than 1 and, therefore, can be kept in a settled condition, being thus capable of enhancing microbial propagation. In addition, as is the case with an ordinary type of charcoal, "Binchotan" charcoal will elute minerals as nutriments for microorganisms, being thus capable of enhancing biological activity of microorganisms.

An embodiment comprises an oxygen dissolution tank adapted to receive water to be treated from the charcoal tank and in which oxygen is dissolved into the water to be treated, the oxygen dissolved water being introduced into the activated carbon tower, the charcoal tank having an aeration device.

According to this embodiment, the interior of the charcoal tank can be constantly aerated by the aeration device so that aerobic microorganisms can be constantly kept in the charcoal tank to enable biological treatment. Since the interior of the charcoal tank is aerated, minerals as nutriments may be efficiently eluted from the charcoal to allow vigorous microbial propagation.

Since the oxygen dissolution tank is disposed prior to the bioactivated carbon tower, the dissolved oxygen in the bioactivated carbon tower can be maintained at a predetermined value to enhance the propagation of aerobic microorganisms.

Biofilm layers are formed through propagation of many kinds of microorganisms in the interior of both the charcoal and the activated carbon. Therefore, persistent surfactants, resist components, and other chemical substances which are generally less microbially decomposable may be adsorbed by the charcoal and activated carbon for subsequent microbial decomposition. Microorganisms immobilized to the charcoal are allowed to actively propagate on the nourishment of minerals eluted from the charcoal and, therefore, nearly all organic substances adsorbed by the charcoal may be microbially decomposed. This eliminates the stage for charcoal regeneration.

Microorganisms immobilized to the activated carbon, as is the case with those on the charcoal, are allowed to actively propagate on the nourishment of minerals eluted from the charcoal and, therefore, nearly all organic substances adsorbed by the activated carbon may be microbially decomposed. This eliminates the stages for activated carbon regeneration and backwashing operation.

An embodiment comprises a return system for returning a portion of the water under treatment from the activated carbon tower to the charcoal tank.

According to this embodiment, a portion of the water being treated may be returned from the activated carbon tower to the charcoal tank. Therefore, by adjusting the quantity of such return water, it is possible to select a mode of operation compatible with the quality of the water under treatment.

In case of such return being made, the return water is supplied with minerals as nutriments which are eluded from the charcoal in the charcoal tank. As return water is increased in quantity, the quantity of water which passes through the activated carbon tower increases and the retention time in the activated carbon tower becomes shorter, so that dissolved oxygen can extend to a lower portion of the activated carbon tower (if the retention time is longer, $O_2$ is consumed in the upper portion and microbial growth in the lower portion can hardly expected). Because of these facts, the propagation of aerobic microorganisms is rendered active in positive manner throughout the entirety of the tower which is packed with activated carbon. This, coupled with the inherent absorption function of the activated carbon, contributes to exceptional improvement in the organic adsorption capability of the bioactivated carbon tower. Therefore, the adsorption of organic matter and the decomposition of organic matter by microorganisms whose activity have become vigorous will proceed in parallel, with the result that the tower itself can be reduced in size.

An embodiment comprises a control system for controlling the quantity of water to be treated for introduction into the charcoal tank, and the quantity of water under treatment for return from the activated carbon tower to the charcoal tank.

In the case where the quality of the to-be-treated water from the pretreatment section is considerably favorable, circulation of return water is not required and, therefore, operation may be carried out without return water. In the case where water return is made during normal operation, the time for water retention in the bioactivated carbon tower is considerably reduced so that dissolved oxygen can be supplied to a lower portion of the tower, it being thus possible to exercise control so as to enhance microbial performance in the tower.

According to the invention, as described above, it is possible to provide a method and apparatus in which charcoal and activated carbon are used for wastewater treatment without any additional stage being required for backwashing and regeneration of such fillers; which can totally treat any trace amounts of persistent surfactant and coloring matter contained in the wastewater; and which is compact in size, economical, and rational.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for wastewater treatment comprising:
   first introducing wastewater into a charcoal tank containing bioactivated charcoal in water to biologically pretreat the wastewater;
   second increasing a concentration of dissolved oxygen in the wastewater by transferring the wastewater from the charcoal tank to an oxygen dissolution tank;
   third introducing wastewater from the oxygen dissolution tank into a bioactivated carbon tower, where the tower is a separate vessel from the charcoal tank and from the oxygen dissolution tank, and the tower contains a non-submerged bioactivated carbon bed to further treat the wastewater in the carbon tower, wherein wastewater is first run through the charcoal tank and oxygen dissolution tank before passing through the carbon tower, and discharging at least a portion of the treated wastewater from the carbon tower directly to a treated water container.

2. An apparatus for wastewater treatment, comprising:

a charcoal tank into which wastewater to be biologically treated is introduced and which is filled with bioactivated charcoal submerged in water; and an oxygen dissolution tank downstream from and in fluid communication with the charcoal tank and having an input through which passes wastewater output from the charcoal tank, an activated carbon tower, downstream from and in fluid communication with the charcoal tank and the oxygen dissolution tank having a fluid input through which passes oxygenated wastewater from the oxygen dissolution tank, and said tower in a vessel separate to the charcoal tank, into which wastewater under treatment from the charcoal tank and oxygen dissolution tank is introduced, and which activated carbon tower contains non-submerged bioactivated carbon, and said tower further having a treated water outlet to a treated wastewater container.

3. A wastewater treatment apparatus as set forth in claim 2, wherein the charcoal is white charcoal.

4. A wastewater treatment apparatus as set forth in claim 2, wherein the charcoal tank has an aeration device.

5. A wastewater treatment apparatus as set forth in claim 2, further comprising:

a return system for returning a portion of the water under treatment from the activated carbon tower to the charcoal tank.

6. A wastewater treatment apparatus as set forth in claim 5, further comprising:

a control system for controlling a quantity of water to be treated for introduction into the charcoal tank, and a quantity of water under treatment for return from the activated carbon tower to the charcoal tank.

7. A method for wastewater treatment comprising the steps of:

(a) introducing wastewater into a charcoal tank including one or more layers of bioactivated charcoal pieces submerged in wastewater, and as the wastewater flows through the charcoal tank minerals from the charcoal pieces leach into the wastewater;

(b) increasing dissolved oxygen in the wastewater in an oxygen dissolution tank receiving the wastewater from the charcoal tank in step (a);

(c) introducing the oxygenated wastewater from the oxygen dissolution tank and with minerals from the charcoal tank into a bioactivated carbon tower in a vessel downstream to and separate form the charcoal tank, and in which tower the wastewater flows over an bioactivated carbon filter, wherein the minerals leached into the wastewater in step (a) provide nutrients for microorganisms in the bioactivated carbon filter, and (d) discharging, at least a portion of the wastewater from the carbon tower to a treated wastewater container, without passing the wastewater through a charcoal tank downstream of the tower.

8. A method for wastewater treatment as in claim 7 wherein in step (a) the charcoal is a white charcoal.

9. A method for wastewater treatment as in claim 7 wherein in step (a) the charcoal is in charcoal pieces that are vertically stacked in layers in the tank.

10. A method for wastewater treatment as in claim 7 wherein in step (a) the charcoal includes a biofilm of aerobic microorganisms which decompose organic matter in the wastewater.

11. A method for wastewater treatment as in claim 10 wherein in step (a) the charcoal tank is aerated.

12. A method for wastewater treatment as in claim 7 further comprising step (e) in which a portion of the water discharged from the tower in step (c) is returned to the charcoal tank.

13. A method for wastewater treatment as in claim 7 wherein in step (a) the charcoal is contained in a basket.

14. A wastewater treatment apparatus as in claim 2 wherein the charcoal is a white charcoal.

* * * * *